US008535749B2

(12) United States Patent
Akahane et al.

(10) Patent No.: US 8,535,749 B2
(45) Date of Patent: Sep. 17, 2013

(54) OIL-AND-FAT COMPOSITION, PROCESS FOR PRODUCTION OF THE COMPOSITION, CHOCOLATE, AND PROCESS FOR PRODUCTION OF THE CHOCOLATE

(75) Inventors: Akira Akahane, Yokosuka (JP);
Yoshiyuki Hatano, Yokosuka (JP);
Hirofumi Haruna, Yokosuka (JP);
Hidetaka Uehara, Yokosuka (JP);
Satoshi Negishi, Yokosuka (JP); Yuka Kikuchi, Yokosuka (JP)

(73) Assignee: The Nisshin Oillio Group, Ltd., Tokyo (JP)

( * ) Notice: Subject to any disclaimer, the term of this patent is extended or adjusted under 35 U.S.C. 154(b) by 322 days.

(21) Appl. No.: 12/810,705

(22) PCT Filed: Dec. 12, 2008

(86) PCT No.: PCT/JP2008/072691
§ 371 (c)(1),
(2), (4) Date: Jun. 25, 2010

(87) PCT Pub. No.: WO2009/081777
PCT Pub. Date: Jul. 2, 2009

(65) Prior Publication Data
US 2010/0278985 A1 Nov. 4, 2010

(30) Foreign Application Priority Data

Dec. 26, 2007 (JP) ................................. 2007-333864
Jul. 23, 2008 (JP) ................................. 2008-189581

(51) Int. Cl.
*A23G 1/00* (2006.01)
*A23D 9/00* (2006.01)

(52) U.S. Cl.
USPC ............................ 426/607; 426/601; 426/631

(58) Field of Classification Search
USPC .......................................... 426/601, 607, 631
See application file for complete search history.

(56) References Cited

U.S. PATENT DOCUMENTS 5,069,915 A * 12/1991 Devitt et al. ..................... 426/93
5,424,091 A * 6/1995 Cain et al. ..................... 426/610
5,431,948 A * 7/1995 Cain et al. ..................... 426/607
5,476,676 A * 12/1995 Cain et al. ..................... 426/607
6,482,464 B1 * 11/2002 Asama et al. ................. 426/631
2009/0136619 A1 5/2009 Uehara et al.

FOREIGN PATENT DOCUMENTS

| JP | 59-135841 A | 8/1984 |
| JP | 07-155107 A | 6/1995 |
| JP | 07-264981 A | 10/1995 |
| JP | 10-099022 A | 4/1998 |
| JP | 11-187814 A | 7/1999 |
| JP | 2005-073613 A | 3/2005 |
| WO | 2008/010543 A1 | 1/2008 |

OTHER PUBLICATIONS

Buchgraber, M. et al. 2004. Journal of Agricultural and Food Chemistry 52:3855.*
Hashimoto, S. 2001. JAOCS 78(5)455.*
Akihisa Urakami, et al., "The Development of Hard Butter by Solvent Fractionation System", Journal of the Japan Oil Chemists Society, 1986, pp. 995 to 1000, vol. 35, No. 12.
Chinese Office Action dated May 11, 2012, issued in corresponding Chinese Application No. 200880122944.9.
Yaonian Xin et al., "HPLC Structural Analysis of Triglycerides in Chinese Vegetable Tallow", China Oils and Fats, 1991, 16(1), pp. 23-30, 60.
Chinese Office Action issued in corresponding CN Application No. 200880122944.9, dated Apr. 19, 2013.
Dictionary of Chinese Traditional Medicine compiled by Jiangsu New Medical College in 1975, 256-257, 359-360, 389-392.

* cited by examiner

*Primary Examiner* — Carolyn Paden
(74) *Attorney, Agent, or Firm* — Sughrue Mion, PLLC

(57) ABSTRACT

Disclosed is an oil-and-fat composition suitable for the coating with a tempered chocolate, particularly suitable for the enrobing with the chocolate. Also disclosed is a low-fat tempered chocolate suitable for coating, particularly enrobing. Specifically disclosed is an oil-and-fat composition which has a content of an oleoyldipalmitin (P2O) component of 70 to 85% by mass, which contains a symmetric triglyceride 1,3-dipalmitoyl-2-oleoylglycerin (POP) in the oleoyldipalmitin (P2O) component at a ratio of the amount of 1,3-dipalmitoyl-2-oleoylglycerin (POP) to the amount of the oleoyldipalmitin (P2O) component [(POP)/(P2O)] of 0.95 or more by mass, and which has a content of tripalmitin (PPP) of 2 to 6% by mass. The oil-and-fat composition is added to a tempered chocolate.

14 Claims, 2 Drawing Sheets

OIL-AND-FAT COMPOSITION, PROCESS FOR PRODUCTION OF THE COMPOSITION, CHOCOLATE, AND PROCESS FOR PRODUCTION OF THE CHOCOLATE

TECHNICAL FIELD

The present invention relates to an oil-and-fat composition, particularly, the present invention relates to an oil-and-fat composition suitable for an enrobing application of a tempering chocolate. In addition, the present invention relates to a chocolate, particularly, the present invention relates to a tempering chocolate suitable for an enrobing application.

Further, the term of "chocolate" in the present invention is not limited to a meaning defined by a law of "law on fair competition for proper labeling of chocolate" or legal regulations, but it also includes a chocolate and an oil-and-fat processed food that use a so-called cacao butter substitute A chocolate contains oil-and-fat containing cacao butter and sweet-tasting substance such as sugar as an essential component, but the cacao butter is relatively expensive, so that use of a fat to be a substitute for the cocoa butter (the cacao butter substitute) has been spread. The cacao butter substitute is broadly divided into a tempering chocolate and a non-tempering chocolate. The tempering chocolate has a symmetric triglyceride structure closely related to the cacao butter, so that it has a good compatibility with the cacao butter and can produce a chocolate with a fragrant flavor peculiar to the cocoa butter, but it needs a temperature control process called a tempering process for unifying a crystal form of the oil-and-fat to β form having a triple-chain-length structure.

Also, a chocolate is broadly used in various forms such as a solid chocolate to be directly eaten, and in addition to this, a coating or enrobing to a baked cake such as biscuit, cookie, and a complex confection such as confection with fillings and sandwiched confection.

In case of enrobing the baked cake and the like with the chocolate, particularly, enrobing with the tempering chocolate, it is needed for the chocolate dough to keep the viscosity low even after the tempering process so as to prevent a variation in products by maintaining a constant amount of the chocolate to be enrobed. Due to this, in case of enrobing the tempering chocolate, in addition to the normal tempering process, a troublesome temperature control is indispensable for the chocolate dough even after the tempering process.

In order to prevent viscosity increase of the chocolate dough after the tempering process, a process for blending a liquid oil having a low melting point or a low melting point hardened oil can be adopted (for example, refer to Patent Literature 1), but although the viscosity can be lowered, there is a drawback that drying speed of the chocolate dough after an enrobing process becomes slow. A small amount of a high melting point oil-and-fat can be added so as to improve the drying speed, but there is a different problem such as viscosity increase or no excellence in meltability in the mouth so that it can not be completely satisfactory.

In addition, palm medium-melting point fraction (PMF) can be also used for an application of softening the chocolate, but it has similarly a problem with heat resistance or the like after the enrobing process. In order to solve the problem of the heat resistance or the like, a hard butter composition is proposed (for example, refer to Patent Literature 2), in which a composition ratio and a total amount of 1-palmito-2-oleo-3-stearin (POSt) and 1,3-stearo-2-olein (StOSt), and diacylglycerol content are defined, but it is not different from the conventional tempering cacao butter substitute in function.

Furthermore, recently, in accordance with a rise in the price of chocolate raw material such as a cacao bean, a cacao butter substitute, a chocolate of low fat content is required from an economic viewpoint, but normally, a tempering chocolate used for the enrobing is needed to have an oil content of about 40% in order to prevent viscosity increase, so that it is difficult to realize the low fat content in comparison with a so-called bar chocolate in which a snap property is emphasized. With regard to the realization of the low fat content, for example, a chocolate of low fat content and low calorie content using special sugars is known (for example, refer to Patent Literature 3), but it is economically inefficient and actual production thereof is considerably difficult.

Patent Literature 1: JP-A-1984 (S59)-135841
Patent Literature 2: JP-A-1995 (H07)-264981
Patent Literature 3: JP-A-1998 (H10)-99022

DISCLOSURE OF THE INVENTION

Problems to be Solved by the Invention

It is an object of the invention to solve the above-mentioned problem and provide an oil-and-fat composition suitable for a coating, particularly an enrobing with a tempering chocolate. In addition, it is another object of the invention to provide a tempering chocolate of low fat content suitable for the coating, particularly the enrobing.

Means for Solving the Problems

The inventors et al. have eagerly investigated to solve the above-mentioned problem, as a result, they have found a phenomenon that in case of blending an oil-and-fat composition containing a modified oil in which symmetry property and concentration of an oleoyldipalmitin (P2O) component of palm medium-melting point fraction are heightened and a tripalmitin (PPP) component to a tempering chocolate, surprisingly, viscosity increase after the tempering process can be prevented, drying speed after the enrobing is fast, and meltability in the mouth is also excellent, so that the present invention has been completed.

In addition, the inventors et al. have eagerly investigated to solve the above-mentioned problem, as a result, they have obtained findings that in case of using a particular oil-and-fat in which symmetry property and concentration of an oleoyldipalmitin (P2O) component of palm medium-melting point fraction are heightened in combination with a polyglycerin condensed ricinoleate, a fat content of the tempering chocolate for the enrobing can be reduced, that has been considered as difficult since if the fat content is reduced, viscosity increase is caused, so that the present invention has been completed.

Namely, a first invention is an oil-and-fat composition, having a content of an oleoyldipalmitin (P2O) component of 70 to 85% by mass, which contains a symmetric triglyceride 1,3-dipalmitoyl-2-oleoylglycerin (POP) in the oleoyldipalmitin (P2O) component at a ratio of the amount of 1,3-dipalmitoyl-2-oleoylglycerin (POP) to the amount of the oleoyldipalmitin (P2O) component [(POP)/(P2O)] of not less than 0.95 by mass and a content of a tripalmitin (PPP) component of 2 to 6% by mass.

A second invention is the oil-and-fat composition further specifying the first invention, wherein the content of the oleoyldipalmitin (P2O) component is 75 to 85% by mass.

A third invention is the oil-and-fat composition further specifying the first or second invention, wherein the content of the tripalmitin (PPP) component is 3 to 5% by mass.

A fourth invention is a tempering chocolate comprising 3 to 60% by mass of the oil-and-fat composition according to any one of the first to third inventions.

A fifth invention is a tempering chocolate comprising 2 to 19% by mass of the oil-and-fat composition according to any one of the first to third inventions, 29 to 38% by mass of a fat and a polyglycerin condensed ricinoleate.

A sixth invention is the tempering chocolate further specifying the fifth invention, wherein the content of the 1,3-dipalmitoyl-2-oleoylglycerin (POP) in the oil-and-fat composition is not less than 72% by mass.

A seventh invention is the tempering chocolate further specifying the fifth or sixth invention, wherein the ratio of the amount of 1,3-dipalmitoyl-2-oleoylglycerin (POP) to the amount of the oleoyldipalmitin (P2O) component [(POP)/(P2O)] is not less than 0.96 by mass.

An eighth invention is the tempering chocolate according to any one of the fourth to seventh inventions, wherein the tempering chocolate is used for coating or enrobing.

A ninth invention is a confectionery product or a bakery product using the tempering chocolate according to any one of the fourth to eighth inventions.

A tenth invention is a process for preventing viscosity increase of a tempering chocolate after tempering process comprising blending 3 to 60% by mass of the oil-and-fat composition according to any one of the first to third inventions into a chocolate.

An eleventh invention is a process for production of a tempering chocolate comprising blending 3 to 60% by mass of the oil-and-fat composition according to any one of the first to third inventions into a chocolate.

A twelfth invention is a viscosity reduction retention agent of a tempering chocolate comprising the oil-and-fat composition according to any one of the first to third inventions; and a polyglycerin condensed ricinoleate.

A thirteenth invention is a process for retaining viscosity reduction of a tempering chocolate comprising blending the oil-and-fat composition according to any one of the first to third inventions and a polyglycerin condensed ricinoleate.

A fourteenth invention is a process for production of a tempering chocolate comprising the steps of blending 2 to 19% by mass of the oil-and-fat composition according to any one of the first to third inventions, and adjusting a content of an fat to 29 to 38% by mass; and blending a polyglycerin condensed ricinoleate.

In addition, instead of the oil-and-fat composition according to any one of the first to third inventions that is described in any one of the above-mentioned fifth to ninth and twelfth to fourteenth inventions, a substitute for oil-and-fat composition described below, namely, an oil-and-fat composition in which the content of the 1,3-dipalmitoyl-2-oleoylglycerin (POP) in the oil-and-fat composition is not less than 65% by mass and the ratio of the amount of 1,3-dipalmitoyl-2-oleoylglycerin (POP) to the amount of the oleoyldipalmitin (P2O) component [(POP)/(P2O)] is not less than 0.90 can be also used, and this is also included in the present invention.

Advantages of the Invention

According to the present invention, an oil-and-fat composition suitable for a coating, particularly an enrobing with a tempering chocolate can be provided. Also, according to the present invention, a tempering chocolate of low fat content suitable for the coating, particularly the enrobing can be provided.

DETAILED DESCRIPTION OF THE PREFERRED EMBODIMENTS

Figure 1:
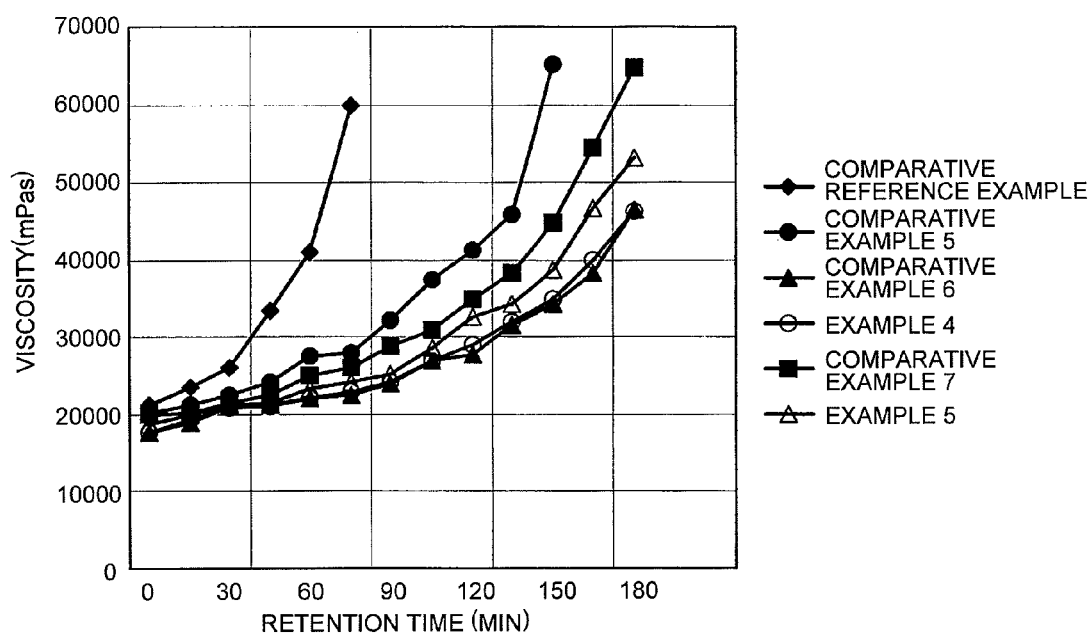
FIG. 1 is a graph showing a viscosity change of chocolate dough after tempering process (Comparative reference example, Examples 4 to 5, Comparative Examples 5 to 7)

First Embodiment of the Invention (Composition of Oil-and-Fat Composition)

An oil-and-fat composition according to the first embodiment has a content of an oleoyldipalmitin (P2O) component of 70 to 85% by mass, which contains a symmetric triglyceride 1,3-dipalmitoyl-2-oleoylglycerin (POP) in the oleoyldipalmitin (P2O) component at a ratio of the amount of 1,3-dipalmitoyl-2-oleoylglycerin (POP) to the amount of the oleoyldipalmitin (P2O) component [(POP)/(P2O)] of not less than 0.95 by mass and a content of a tripalmitin (PPP) component of 2 to 6% by mass. Here, symbols representing fatty acid are explained as P is palmitic acid and O is oleic acid.

The oleoyldipalmitin (P2O) described in the present invention means triacylglycerol species in which palmitic acid is bound to two sites and oleic acid is bound to one site regardless of binding position, namely summation of PPO, POP and OPP. That corresponding to symmetric triglyceride of oleoyldipalmitin (P2O) is only POP of 1,3-dipalmitoyl-2-oleoylglycerin. "Mass ratio of symmetric triglyceride (POP) is not less than 0.95" means "(POP)/(P2O) is not less than 0.95 in a mass base".

The oil-and-fat composition according to the present invention is needed to have a P2O content of 70 to 85% by mass, and it is preferable that the P2O content is 75 to 85% by mass and more preferable that the P2O content is 75 to 80% by mass. Although the oil-and-fat composition like this can be also obtained by chemical synthesis, it is economically preferable to obtain it by processing, such as fractionating, a vegetable oil-and-fat containing P2O-rich, particularly palm oil.

The oil-and-fat composition according to the present invention is needed to have a mass ratio (POP/P2O) of symmetric triglyceride (POP) to the abovementioned P2O component of not less than 0.95, and it is preferable that the mass ratio (POP/P2O) is not less than 0.96 and more preferable that the mass ratio (POP/P2O) is not less than 0.97.

In case that the P2O content and the mass ratio (POP/P2O) are included in the above-mentioned range, by blending it into the tempering chocolate, viscosity increase of the chocolate dough after the tempering process can be significantly prevented.

A process for increasing a POP concentration in P2O includes preparing a raw material oil by appropriately selecting from a medium-melting point fraction (soft, Iodine Value, hereinafter referred to as IV: 41 to 47, POP: not less than 40% by mass, P2O: not less than 50% by mass, POP/P2O=0.82 to 0.90) obtained by eliminating a high-melting point fraction (palm stearin, IV: 30 to 36) and a low-melting point fraction (IV: 62 to 68) from palm oil (IV: about 52) by dry fractionation and/or solvent fractionation, and a medium-melting point fraction (hard, IV: 31 to 37, POP: not less than 55% by mass, P2O: not less than 70% by mass, POP/P2O=0.84 to 0.94) obtained by further eliminating a low-melting point fraction from a medium-melting point fraction (soft), mixing it with palmitic acid, heightening the POP concentration by carrying out 1,3-selective trans-esterification by using a lipase preparation and then eliminating remaining fatty acid by distillation, and obtaining a medium-melting point fraction by further eliminating tri-saturated triglycerides (mainly PPP) and di-unsaturated mono-saturated triglycerides by fractionation. More particularly, this is disclosed in, for example, JP-A-1980(S55)-71797 and JP-A-1986(S61)-209298. Another process includes preparing a similar palm medium-melting point fraction as a raw material oil, heightening the mass ratio of POP/P2O by carrying out 1,3-selective trans-esterification by using a lipase preparation and then obtaining a medium-melting point fraction by eliminating tri-saturated triglycerides (mainly PPP) and di-unsaturated mono-saturated triglycerides formed as a by-product, by fractionation. More particularly, this is disclosed in, JP-A-1999 (H11)-169191. In addition, another process includes preparing a similar palm medium-melting point fraction as a raw material oil, repeating solvent fractionation and dry fractionation and obtaining a medium-melting point fraction. More particularly, this is disclosed in, JP-A-2000-336389.

The oil-and-fat composition according to the present invention is needed to have a content of the tripalmitin (PPP) component of 2 to 6% by mass, and it is preferable that the tripalmitin (PPP) content is 3 to 5.5% by mass and more preferable that the tripalmitin (PPP) content is 3 to 5% by mass. It is most preferable that the tripalmitin (PPP) content is 3 to 4% by mass. Generally, it has been considered that the smaller the content thereof is, the more preferable the tri-saturated triglyceride in a substitute for tempering oil-and-fat is, that is exemplified as a palm medium-melting point processing oil in the above-mentioned Patent Literature, since it causes viscosity increase after the tempering and meltability decrease in the mouth, but it has been found that in case of the oil-and-fat composition according to the present invention, surprisingly, by containing an appropriate amount (2 to 6% by mass), viscosity increase is not caused after the tempering, fast dry is achieved after the coating or enrobing and good meltability in the mouth is obtained. The PPP content can be adjusted by adding an oil-and-fat of tripalmitin-rich thereto or using PPP formed as a by-product in a trans-esterification reaction.

(Process for Production of the Oil-and-Fat Composition)

The oil-and-fat composition according to the present invention is produced by blending the above-mentioned palm medium-melting point processing oil in which the P2O content and the mass ratio of POP/P2O are heightened, for example, a medium-melting point fraction obtained by preparing a palm medium-melting point fraction as a raw material oil, heightening the mass ratio of POP/P2O by carrying out 1,3-selective trans-esterification by using a lipase preparation and then eliminating tri-saturated triglycerides (mainly PPP) and di-unsaturated mono-saturated triglycerides (mainly POO) which are formed as a by-product by fractionation, and a small amount of tripalmitin or an oil-and-fat of tripalmitin-rich, so as to obtain an oil-and-fat composition that has a content of an oleoyldipalmitin (P2O) component of 70 to 85% by mass, which contains a symmetric triglyceride 1,3-dipalmitoyl-2-oleoylglycerin (POP) in the oleoyldipalmitin (P2O) component at a ratio of the amount of 1,3-dipalmitoyl-2-oleoylglycerin (POP) to the amount of the oleoyldipalmitin (P2O) component [(POP)/(P2O)] of not less than 0.95 by mass and a content of a tripalmitin (PPP) component of 2 to 6% by mass. The oil-and-fat of tripalmitin-rich includes a two-step fractionation stearin (hereinafter referred to as palm hard stearin, Iodine Value: less than 15, PPP content: not less than 70% by mass) obtained by further fractionating palmstearin, and it is preferable that the blending ratio thereof into the oil-and-fat composition is 2 to 6% by mass.

A more preferable process for production of the oil-and-fat composition according to the present invention includes preparing a palm medium-melting point fraction similar to the above as a starting raw material, obtaining a high-melting point fraction or a medium-melting point fraction in which P2O is condensed to not less than 70% by mass by the solvent fractionation or dry fractionation and the mass ratio (POP/P2O) is heightened preferably to 0.89 to 0.94, more preferably to 0.91 to 0.94 and then carrying out a trans-esterification reaction by using a lipase preparation having high 1,3-selectivity. According to this process, since the mass ratio (POP/P2O) is further heightened at the last process of trans-esterification and PPP is simultaneously produced, it is not necessary to add PPP later and differently, and it is economically preferable.

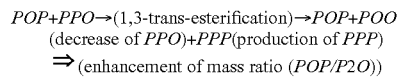

$POP+PPO \rightarrow (1,3\text{-trans-esterification}) \rightarrow POP+POO$
(decrease of $PPO$)+$PPP$(production of $PPP$)
$\Rightarrow$ (enhancement of mass ratio ($POP/P2O$))

(Application of Oil-and-Fat Composition)

The oil-and-fat composition according to the present invention is used to be blended into the tempering chocolate and has an advantage capable of preventing viscosity increase of chocolate dough after the tempering process, so that it is suitable for a coating with a chocolate, particularly suitable for an enrobing with a chocolate which is executed by an enrobing machine. In addition, it can be used for a confectionery oil-and-fat other than a chocolate, the confectionery oil-and-fat being suitable for, for example, an oil-and-fat for kneading bakery dough, an oil-and-fat for spray coating, an oil-and-fat for cream.

(Other Component in Oil-and-Fat Composition: Emulsifier)

The oil-and-fat composition according to the present invention can contain an emulsifier unless the functions thereof are inhibited, so as to attain an enhancement of bloom resistance, a functional enhancement of anti-migration and so on. The emulsifier is not particularly limited if it is used as food, but it is preferable to use one or more than two emulsifier(s) selected from the group consisting of polyglyceryl fatty acid ester, sucrose fatty acid ester, and sorbitan fatty acid ester, and it is more preferable to use polyglyceryl fatty acid ester or sucrose fatty acid ester.

(Content of Oil-and-Fat Composition in Chocolate)

A content of the oil-and-fat composition according to the present invention in the tempering chocolate is preferably not less than 3% by mass and more preferably not less than 5% by mass. The upper limit of the content of the oil-and-fat composition corresponds to the upper limit of the oil content of the tempering chocolate, and generally, it is 35 to 60% by mass. Consequently, the content of the oil-and-fat composition according to the present invention in the tempering chocolate is 3 to 60% by mass, preferably 3 to 35% by mass, more preferably 3 to 20% by mass, furthermore preferably 3 to 15% by mass and most preferably 5 to 15% by mass.

However, with regard to the content of oil-and-fat composition, demand characteristics of the tempering chocolate have to be taken into consideration, for example, if the 5% rule by CODEX Alimentarius Commission at the present (if a content of a cacao butter substitute in a chocolate is more than 5%, a representation of "chocolate" is not be permitted) is taken into account, there is a case that the content of 3 to 5% by mass is preferable. By blending the oil-and-fat composition according to the present invention into the tempering chocolate within the above-mentioned range, viscosity increase of the chocolate dough after the tempering process can be significantly prevented.

(Process for Production of Chocolate)

A tempering chocolate according to the present invention can be produced basically dependent on the conventional known process except for using the oil-and-fat composition according to the embodiment. For example, the tempering chocolate can be produced by that after a mixing process of a solid content such as powder sugar, cacao mass and an oil-and-fat is carried out, roll application and conching to the mixture are carried out, and after the tempering process, cooling and solidification are carried out.

(Other Components in Chocolate)

The tempering chocolate according to the present invention can contain an emulsifier unless the functions thereof are inhibited, so as to attain an enhancement of bloom resistance of the chocolate, a functional enhancement of anti-migration and so on. The emulsifier is not particularly limited if it is used as food, but it is preferable to use one or more than two emulsifier(s) selected from the group consisting of polyglyceryl fatty acid ester, sucrose fatty acid ester, and sorbitan fatty acid ester, and it is more preferable to use polyglyceryl fatty acid ester or sucrose fatty acid ester.

In addition, the tempering chocolate according to the present invention can contain a cacao component, sugar, protein material, dairy product, carbohydrate, antioxidant agent, vitamin, condiment, spice, water and the like that are usually contained in the chocolate.

(Application of Chocolate)

The tempering chocolate according to the present invention can be used for any applications, if usual applications of the chocolate, but the tempering chocolate has an advantage capable of preventing viscosity increase of chocolate dough after the tempering process, so that it is suitable for a coating with the chocolate, particularly suitable for an enrobing with the chocolate which is executed by an enrobing machine. In addition, the tempering chocolate according to the present invention can be preferably used for confectionery and bakery.

(Advantages of the First Embodiment of the Invention)

According to the embodiment, not less than 3% by mass of the oil-and-fat composition according to the present invention are blended into a tempering chocolate, so that a tempering chocolate for the coating, particularly, for the enrobing in which viscosity increase after the tempering process can be prevented, drying speed after the coating, particularly, after the enrobing is fast, and meltability in the mouth is also excellent, can be provided.

Second Embodiment of the Invention (Composition of Chocolate)

A tempering chocolate according to the second embodiment of the present invention includes 2 to 19% by mass of the above-mentioned oil-and-fat composition according to the first embodiment, and has an oil content of 29 to 38% by mass, and further includes polyglycerin condensed ricinoleate.

(Substitute for Oil-and-Fat Composition)

In the second embodiment of the present invention, instead of the oil-and-fat composition according to the first embodiment, an oil-and-fat composition in which the content of the 1,3-dipalmitoyl-2-oleoylglycerin (POP) is not less than 65% by mass and the ratio of the amount of 1,3-dipalmitoyl-2-oleoylglycerin (POP) to the amount of the oleoyldipalmitin (P2O) component [(POP)/(P2O)] is not less than 0.90 can be also used.

Although the oil-and-fat composition in which the content of POP is not less than 65% by mass can be also obtained by chemical synthesis, it is economically preferable to obtain it by processing, such as fractionating, a vegetable oil-and-fat containing POP-rich, particularly palm oil. A process for heightening the POP concentration includes the above-mentioned process.

The POP content in the oil-and-fat composition is needed to be not less than 65% by mass, and it is preferable to be not less than 72% by mass. The upper limit of the POP content is not particularly limited, but excessive condensation contributes to cost increase beyond an effect to be expected, so that it is preferable to be not more than 90% by mass, and more practically to be not more than 80% by mass.

The mass ratio (POP/P2O) of POP to P2O is needed to be not less than 0.90, it is preferable to be not less than 0.92, it is more preferable to be not less than 0.94 and it is most preferable to be not less than 0.96. The upper limit is not particularly limited, but excessive enhancement in POP contributes to cost increase beyond an effect to be expected, so that it is preferable to be not more than 0.98. In case that the mass ratio (POP/P2O) is included in the above-mentioned range, by blending it into the tempering chocolate, meltability in the mouth can be improved and viscosity increase of the chocolate dough after the tempering process can be significantly prevented.

The tripalmitin (PPP) content in the oil-and-fat composition can be similar to the oil-and-fat composition according to the first embodiment of the present invention, but in the substitute for oil-and-fat composition, it is not essential to define the PPP content, it is preferable that the lower limit is not less than 1% by mass, and it is more preferable that 2 to 6% by mass of PPP are contained.

The substitute for oil-and-fat composition is preferably produced by blending the above-mentioned palm medium-melting point processing oil in which the POP content and the mass ratio of POP/P2O are heightened, for example, a medium-melting point fraction obtained by preparing a palm medium-melting point fraction (hard) as a raw material oil, heightening the mass ratio of POP/P2O by carrying out 1,3-selective trans-esterification by using a lipase preparation and then eliminating tri-saturated triglycerides (mainly PPP) and di-unsaturated mono-saturated triglycerides (mainly POO) which are formed as a by-product by fractionation so as to heighten the POP content, and a small amount of tripalmitin or an oil-and-fat of tripalmitin-rich, so as to obtain an oil-and-fat composition that has the POP content of not less than 65% by mass, the mass ratio (POP/P2O) of not less than 0.90, and the tripalmitin (PPP) content of 2 to 6% by mass. The oil-and-fat of tripalmitin-rich includes a two-step fractionation stearin (hereinafter referred to as palm hard stearin, Iodine Value: less than 15, PPP content: not less than 70% by mass) obtained by further fractionating palmstearin, and it is preferable that the blending ratio thereof into the oil-and-fat composition is 2 to 6% by mass.

A more preferable process for production of the substitute for oil-and-fat composition according to the present invention includes preparing a palm medium-melting point fraction (hard) similar to the above as a starting raw material, obtaining a high-melting point fraction or a medium-melting point fraction in which POP is condensed to not less than 70% by mass by the solvent fractionation or dry fractionation and the mass ratio (POP/P2O) is heightened preferably 0.89 to 0.94, more preferably 0.91 to 0.94 and then carrying out a trans-esterification reaction by using a lipase preparation having high 1,3-selectivity. According to this process, since the mass ratio (POP/P2O) is further heightened at the last process of trans-esterification and PPP is simultaneously produced, it is not necessary to add PPP later and differently, and it is economically preferable.

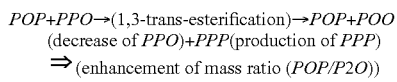

$$POP+PPO \to (1,3\text{-trans-esterification}) \to POP+POO$$
$$(\text{decrease of } PPO)+PPP(\text{production of } PPP)$$
$$\Rightarrow (\text{enhancement of mass ratio } (POP/P2O))$$

(Content of Oil-and-Fat Composition in Chocolate)

A content of the oil-and-fat composition according to the embodiment in the tempering chocolate is 2 to 19% by mass in the tempering chocolate, preferably 3 to 14% by mass and more preferably 3 to 9% by mass. By blending the oil-and-fat composition constituting the present invention within the above-mentioned range into the tempering chocolate, viscosity increase after the tempering process can be significantly prevented even if the chocolate composition is cacao butter-rich. In addition, a content of the oil-and-fat composition in a fat of the chocolate is preferably 5 to 50% by mass, more preferably 7 to 30% by mass and most preferably 9 to 19% by mass.

(Polyglycerin Condensed Ricinoleate)

The tempering chocolate according to the present invention includes polyglycerin condensed ricinoleate other than the above-mentioned oil-and-fat composition according to the first embodiment of the present invention or the above-mentioned substitute for oil-and-fat composition. Polyglycerin condensed ricinoleate may be represented as condensed ricinoleic acid polyglycerin, polyglycerin polyricinoleate, polyglycerin condensed ricinoleic acid ester or the like. It is produced by esterification between condensed ricinoleic acid obtained by dehydrating and condensing ricinoleic acid mainly obtained from ricinus, and polyglycerin, but practically, it is preferable to use a marketed product, since it is convenient and economic. As the marketed product, trade names of SY-GlysterCR-310, CR-500, CR-ED, and CRS-75 manufactured by Sakamoto Yakuhin Kogyo Co. Ltd., and trade names of Sunsoft No. 818DG, 818SK, 818R and the like manufactured by Taiyo kagaku Co. Ltd. can be appropriately used.

An additive amount of polyglycerin condensed ricinoleate to the tempering chocolate is preferably 0.1 to 1.0% by mass to the whole amount of the chocolate, more preferably 0.1 to 0.5% by mass. In case that the additive amount is included within the above-mentioned range, an effect continuing viscosity decrease of the chocolate dough can be obtained economically and effectively, so that it is preferable. Additionally, in case that polyglycerin condensed ricinoleate is used in combination with 0.1 to 1.0% by mass, preferably 0.1 to 0.5% by mass of lecithin, an effect continuing viscosity decrease of the chocolate dough can be obtained further economically and effectively, so that it is preferable.

(Fat of Chocolate)

The tempering chocolate according to the present invention uses polyglycerin condensed ricinoleate in combination with the above-mentioned oil-and-fat composition according to the first embodiment of the present invention or the above-mentioned substitute for oil-and-fat composition, so that it can obtain the effect continuing viscosity decrease also after the tempering process even though it has a lower content of the fat than a usual tempering chocolate used for the enrobing (fat content is about 40%). The effect continuing viscosity decrease means an effect that not only decreases viscosity of the dough right after the tempering process, but also continues a state of low viscosity for several hours after that.

The fat content of the tempering chocolate according to the present invention is 29 to 38% by mass, preferably 31 to 37% by mass, and more preferably 33 to 36% by mass. In case that the fat content of the tempering chocolate according to the present invention is included within the above-mentioned range, an effect continuing viscosity decrease after the tempering process can be obtained, so that it is preferable.

(Viscosity of Chocolate Dough after Tempering Process)

Viscosity of the chocolate dough after the tempering process is preferably 10000 to 30000 mPas, more preferably 10000 to 25000 mPas, and most preferably 10000 to 20000 mPas, in case that measurement of viscosity is carried out under the condition that a Brookfield type viscometer is used, a temperature is 32 degrees C., rotor number is 6, rotation number is 4 rpm. In case that the viscosity of the chocolate dough after the tempering process is included within the above-mentioned range, the enrobing process is stably carried out, so that it is preferable.

(Viscosity Decrease Continuing Agent)

In the tempering chocolate according to the present invention, it is preferable to use a mixture prepared by mixing the above-mentioned oil-and-fat composition according to the first embodiment of the present invention or the above-mentioned substitute for oil-and-fat composition and the polyglycerin condensed ricinoleate as an agent (viscosity decrease continuing agent) since it is convenient. It is preferable that a mixing ratio (mass ratio) of the oil-and-fat composition and the polyglycerin condensed ricinoleate in the viscosity decrease continuing agent is 90:10 to 99:1. The viscosity decrease continuing agent is obtained by mixing the oil-and-fat composition and the polyglycerin condensed ricinoleate and heating and melting if needed, so as to form a uniform mixture. A blending amount of the viscosity decrease continuing agent into the tempering chocolate is preferably 2 to 19% by mass, more preferably 3 to 14% by mass, most preferably 3 to 9% by mass. In case that the blending amount is included within the above-mentioned range, the effect continuing viscosity decrease can be obtained, so that it is preferable.

(Process for Production of Chocolate)

The tempering chocolate according to the present invention can be produced basically dependent on the conventional known process except for adjusting the fat content of the tempering chocolate according to the present invention to be 29 to 38% by mass, and simultaneously using polyglycerin condensed ricinoleate in combination with the above-mentioned oil-and-fat composition according to the first embodiment of the present invention or the above-mentioned substitute for oil-and-fat composition. For example, it can be produced by that after a mixing process of a solid content such as powder sugar, cacao mass and an oil-and-fat is carried out, roll application and conching to the mixture are carried out, and after the tempering process, cooling and solidification are carried out. It is preferable that polyglycerin condensed ricinoleate is added at the time of fat addition of the conching.

(Other Components in Chocolate)

The tempering chocolate according to the present invention can contain an emulsifier as the other components unless the functions thereof are inhibited, so as to attain an enhancement of bloom resistance of the chocolate, a functional enhancement of anti-migration and so on. The emulsifier is not particularly limited if it is used as food, but it is preferable to use one or more than two emulsifier (s) selected from the group consisting of polyglyceryl fatty acid ester other than polyglycerin condensed ricinoleate, sucrose fatty acid ester, and sorbitan fatty acid ester, and it is more preferable to use polyglyceryl fatty acid ester or sucrose fatty acid ester.

In addition, the tempering chocolate according to the present invention can contain a cacao component, sugar, protein material, dairy product, carbohydrate, antioxidant agent, vitamin, condiment, spice, water and the like that are usually contained in the chocolate.

(Application of Chocolate)

The tempering chocolate according to the present invention can be used for any applications, if usual applications of the chocolate, but the tempering chocolate has an advantage capable of preventing viscosity increase of chocolate dough after the tempering process, so that it is suitable for a coating with the chocolate, particularly suitable for an enrobing with the chocolate which is executed by an enrobing machine. In addition, the tempering chocolate according to the present invention can be preferably used for confectionery and bakery.

(Advantages of the Second Embodiment of the Invention)

According to the embodiment, a tempering chocolate having a high economic efficiency because of a low fat content, and having a low fat content (fat content is 29 to 38% by mass) suitable for the coating, particularly, the enrobing which viscosity just after the tempering process can be reduced, viscosity increase after the tempering process can be prevented, a state of viscosity decrease can be continued for a long time, drying speed after the coating, particularly, after the enrobing is fast, and meltability in the mouth is also excellent, can be provided.

EXAMPLES

Hereinafter, the present invention will be explained further in detail by Examples, but the present invention is not limited by these Examples at all.

(Preparing Lipase Preparation)

Lipase Preparation A:

Powder lipase preparation A was obtained as follows. First, 5 g of "Lipozyme TL-IM" manufactured by Novozymes A/S were crushed by using an L-type Mycolloider manufactured by Tokushu Kika Kogyo Co. Ltd. When particle size of the crushed lipase was measured by using a particle size distribution analyzer LA-500 manufactured by Horiba, Ltd., an average particle size was 66.4 μm. Next, 5 g of cellulose powder (manufactured by Nippon Paper Chemicals Co., Ltd., average particle size: 30 μm) were added to the powder as a filter aid, so as to obtain a powder composition. Next, 90 g of canola oil (manufactured by the Nisshin OilliO Group, Ltd.) and 10 g of trade name: O.D.O (caprylic/capric triglyceride manufactured by the Nisshin OilliO Group, Ltd.) were added to 5 g of the powder composition, and agitated at 25 degrees C. for 5 hours, and then filtered.

Lipase Preparation B:

Powder lipase preparation B was obtained as follows. First, 10% aqueous solution of deodorized whole fat soybean powder (fat content: 23% by mass, trade name: Alpha Plus HS-600, manufactured by Nisshin Cosmo Foods, Co., Ltd.) in which autoclave sterilization (at 121 degrees C., for 15 minutes) was preliminarily carried out and then the temperature was cooled down up to about room temperature, was added to an enzyme solution (150000 U/ml) of trade name: lipase DF "Amano" 15-K (sometimes referred to as lipase D) manufactured by Amano Enzyme Inc., while being agitate, wherein, an additive amount of the aqueous solution of deodorized whole fat soybean powder was thrice as much as an additive amount of the enzyme solution, next, it was adjusted to have pH of 7.8 by using 0.5 N NaOH solution and then spray drying (manufactured by Tokyo Rikakikai Co., Ltd., SD-1000type) was carried out.

Examples 1 to 8, Comparative Examples 1 to 9

Preparing Oil-and-Fat Composition

Comparative Example 1

Oil-and-Fat Composition 1

A palm medium-melting point fraction 1 (composition: POP content of 62.3% by mass, PPO+OPP of 11.9% by mass, manufactured by Intercontinental Specialty Fats Sdn. Bhd. (Malaysia ISF Company)) was defined as an oil-and-fat composition 1.

Comparative Example 2

Oil-and-Fat Composition 2

First, 0.2% by mass of the lipase preparation A was added to 1200 g of the palm medium-melting point fraction 1 (composition: POP content of 62.3% by mass, PPO+OPP of 11.9% by mass, manufactured by Intercontinental Specialty Fats Sdn. Bhd. (Malaysia ISF Company)) and an agitation reaction was carried out at 70 degrees C. for 2 hours. Next, the lipase preparation A was eliminated by a filtration treatment, so as to obtain 1184 g of reactant. Next, after 5660 g of acetone was added to 1132 g of the reactant obtained so that the reactant was dissolved, and solid content which was obtained by being cooled to 20 degrees C. was eliminated. Next, after solid content which was obtained by that liquid portion was further cooled to 5 degrees C. was separated by filtration, elimination of acetone and purification were carried out in the usual manner, so as to obtain 792 g of an oil-and-fat composition 2.

Example 1

Oil-and-Fat Composition 3

Palm hard stearin (Iodine Value: 13) was added to the oil-and-fat composition 2, whose additive amount was 2% to the oil-and-fat, so as to obtain an oil-and-fat composition 3.

Comparative Example 3

Oil-and-Fat Composition 4

A palm medium-melting point fraction 2 (composition: POP content of 71.5% by mass, PPO+OPP of 6.2% by mass, manufactured by Intercontinental Specialty Fats Sdn. Bhd. (Malaysia ISF Company)) was defined as an oil-and-fat composition 4.

Example 2

Oil-and-Fat Composition 5

First, 0.3% by mass of the lipase preparation B was added to 350 g of the palm medium-melting point fraction 2 (composition: POP content of 71.5% by mass, PPO+OPP of 6.2% by mass, manufactured by Intercontinental Specialty Fats Sdn. Bhd. (Malaysia ISF Company)) and an agitation reaction was carried out at 50 degrees C. for 2 hours. Next, the lipase preparation B was eliminated by a filtration treatment, so as to obtain 337 g of reactant. Next, purification was carried out in the usual manner, so as to obtain 283 g of an oil-and-fat composition 5.

Example 3

Oil-and-Fat Composition 6

Palm hard stearin (Iodine Value: 13, PPP content of 71%) was added to the oil-and-fat composition 2, whose additive amount was 6% by mass to the oil-and-fat, so as to obtain an oil-and-fat composition 6.

Comparative Example 4

Oil-and-Fat Composition 7

Palm hard stearin (Iodine Value: 13, PPP content of 71%) was added to the oil-and-fat composition 2, whose additive amount was 9% by mass to the oil-and-fat, so as to obtain an oil-and-fat composition 7.

Composition of triacylglyceride (TAG) and the mass ratio of POP/P2O in the above-mentioned oil-and-fat compositions 1 to 7 are shown in Table 1 ("%" in the table shows "% by mass"). The TAG composition was analyzed by GLC (GC-2010 manufactured by Shimadzu Corporation) and the mass ratio of POP/P2O was analyzed by LC-MS/MS ("Quattro micro" manufactured by Nihon Waters K.K.).

Hereinafter, the analysis method of the TAG composition by using the GLC will be explained further in detail. The GLC analysis conditions will be described below.

Column: Rtx-65TG (manufactured by Restek Corporation), 15 m×0.1 µm×0.25 mm
Detector: FID
Carrier gas: He
Split ratio: 60:1
Column temperature (degrees C.): 350 degrees C. (1 min) →(1 degree C./min)→365 degrees C. (4 min)
Inlet temperature: 365 degrees C.
Detector temperature: 365 degrees C.

Hereinafter, the analysis method of the mass ratio of POP/P2O by using the LC-MS/MS will be explained further in detail. The LC-MS/MS analysis conditions will be described below.

Column: conventional ODS columns (4.6 mm×25 cm) dual linkage
Elution solvent: acetone/acetonitrile mixture 80/20 to 100/0 Gradient mode
Flow Rate: 0.5 ml/min
Ion source: APCI
Mass analysis part: MRM mode First, the ratio of POP and (PPO+OPP) was calculated by using a calibration curve prepared from standards of POP and PPO (manufactured by Funakoshi Corporation). POP and PPO were mixed while the ratio was varied, and supplied to the LC-MS/MS under the above-mentioned conditions. Ratios of Product ions M/Z=551 (PO) and M/Z=577 (PP) of M/Z=833 (P2O), i.e., values of PO/PP were calculated, the calibration curve was obtained between the values and a value of a ratio of standard mixing of POP and PPO. Samples were analyzed under the above-mentioned conditions similarly to the standard, so as to obtain the mass ratio of PO/PP, and a ratio of POP and (PPO+OPP) was calculated due to the calibration curve and was converted to the mass ratio of POP/P2O.

TABLE 1

Table 1. (Unit in Table 1: % by mass, except for ratio of (POP/P2O)

| TAG composition (%) | Oil-and-fat composition 1 Com. EX. 1 | Oil-and-fat composition 2 Com. EX. 2 | Oil-and-fat composition 3 EX. 1 | Oil-and-fat composition 4 Com. EX. 3 | Oil-and-fat composition 5 EX. 2 | Oil-and-fat composition 6 EX. 3 | Oil-and-fat composition 7 Com. EX. 4 |
|---|---|---|---|---|---|---|---|
| PPP | 3.2 | 1.3 | 3.1 | 1.8 | 3.7 | 5.5 | 7.6 |
| P2St | 0.3 | 0.3 | 0.3 | 0.5 | 0.5 | 0.5 | 0.6 |
| P2O | 74.2 | 79.7 | 79.6 | 77.7 | 75.8 | 77.1 | 74.5 |
| P2L | 6.0 | 1.3 | 1.3 | 3.0 | 3.0 | 1.1 | 0.9 |
| PSt2 | tr | tr | tr | tr | tr | tr | tr |
| POSt | 10.9 | 12.6 | 12.6 | 12.5 | 12.7 | 12.0 | 11.8 |
| PO2 | 1.3 | 0.2 | 0.2 | 0.4 | 2.1 | 0.2 | 0.2 |
| St2O | 0.9 | 1.1 | 1.1 | 1.1 | 1.3 | 1.0 | 1.0 |
| StO2 | tr | tr | tr | tr | 0.1 | tr | tr |
| Others | 3.2 | 3.5 | 1.8 | 3.0 | 0.8 | 3.1 | 3.4 |
| ratio of (POP/P2O) | 0.84 | 0.98 | 0.98 | 0.92 | 0.96 | 0.97 | 0.95 |

(Notes):
Com. EX.: Comparative Example, EX.: Example
P: palmitic acid, St: stearic acid, O: Oleic acid, L: linoleic acid, tr: trace amount

[Verification 1 of Viscosity Increase Prevention Effect in Chocolate Dough]

First, 1300 g of chocolate dough (Comparative Reference Example, Comparative Examples 5 to 7 and Examples 4 to 5) were prepared by using the respective oil-and-fat compositions 1 to 5 (Comparative Examples 1 to 3 and Examples 1 to 2) in accordance with the blending shown in Table 2, after a tempering process was carried out by using a desktop type tempering machine under the condition of 50 degrees C./3 min→29 degrees C./1 min→31 degrees C./3 min, it was moved to a mixer with a temperature controller in which viscosity change at 31 degrees C. was recorded with time. The viscosity was measured under the condition that a BH type viscometer is used, rotor number is 6, rotation number is 4 rpm. The measurement result is shown in Table 3 and FIG. 1 (unit of viscosity in Table 3 and FIG. 1 is mPas).

In addition, separately, the chocolate dough after the tempering process was poured into a mold so as to check a demolding property that is used as a reference index of drying speed. After the chocolate obtained was preserved at 20 degrees C. for a week, an evaluation of meltability in the mouth was carried out. The result is shown in Table 2.

[Demolding Property]
◎: demolded at 15 minutes after cooling (fast drying)
○: Demolded at 20 minutes after cooling
Δ: not demolded at the above-mentioned time (slow drying)

[Meltability in the Mouth]
◎: good in meltability in the mouth
○: good in meltability in the mouth, but a little remains later
Δ: bad in meltability in the mouth

TABLE 2

Table 2. (Unit in Table 2: % by mass)

|  | Com. REF. EX. | Com. EX. 5 | Com. EX. 6 | EX. 4 | Com. EX. 7 | EX. 5 |
|---|---|---|---|---|---|---|
| Powder sugar | 41.5 | 41.5 | 41.5 | 41.5 | 41.5 | 41.5 |
| Cacao mass | 40.0 | 40.0 | 40.0 | 40.0 | 40.0 | 40.0 |
| Cacao butter | 18.0 | 13.0 | 13.0 | 13.0 | 13.0 | 13.0 |
| Oil-and-fat composition 1 | — | 5.0 | — | — | — | — |
| Oil-and-fat composition 2 | — | — | 5.0 | — | — | — |
| Oil-and-fat composition 3 | — | — | — | 5.0 | — | — |
| Oil-and-fat composition 4 | — | — | — | — | 5.0 | — |
| Oil-and-fat composition 5 | — | — | — | — | — | 5.0 |
| Lecuthin | 0.50 | 0.50 | 0.50 | 0.50 | 0.50 | 0.50 |
| Peel Property | ◎ | ○ | ○ | ◎ | ○ | ◎ |
| Meltability in the mouth | ◎ | ◎ | ◎ | ◎ | ◎ | ◎ |

(Notes):
Com. REF. EX.: Comparative Reference Example
Com. EX.: Comparative Example, EX.: Example

TABLE 3

Table 3. (Viscosity change 1 of chocolate dough) (Unit of viscosity: mPas)

|  |  | Com. REF. EX. | Com. EX. 5 | Com. EX. 6 | EX. 4 | Com. EX. 7 | EX. 5 |
|---|---|---|---|---|---|---|---|
| Retention time (min) | 0 | 21250 | 20250 | 17750 | 17750 | 20000 | 18750 |
|  | 15 | 23500 | 21250 | 19000 | 19250 | 20250 | 20000 |
|  | 30 | 26000 | 22500 | 21000 | 20750 | 21500 | 21250 |
|  | 45 | 33500 | 24250 | 21250 | 21000 | 22500 | 21500 |
|  | 60 | 41000 | 27500 | 22000 | 22000 | 25000 | 23250 |
|  | 75 | 60000 | 28000 | 22500 | 23000 | 26000 | 24250 |
|  | 90 | — | 32250 | 24000 | 24250 | 28750 | 25250 |
|  | 105 | — | 37500 | 27000 | 27000 | 31000 | 28500 |
|  | 120 | — | 41250 | 27750 | 29000 | 35000 | 32500 |
|  | 135 | — | 45750 | 31500 | 32000 | 38250 | 34250 |
|  | 150 | — | 65250 | 34250 | 35000 | 44750 | 38750 |
|  | 165 | — | — | 38250 | 40000 | 54500 | 46750 |
|  | 180 | — | — | 46500 | 46250 | 64750 | 53250 |

(Notes):
Com. REF. EX.: Comparative Reference Example
Com. EX.: Comparative Example, EX.: Example The following has been found from the results shown in Tables 1 to 3 and FIG. 1.

All of the oil-and-fat compositions 1 to 7 have the P2O content that is included within a range of 70 to 85% by mass, and among them, the oil-and-fat compositions 2 to 6 have the P2O content that is included within a range of 75 to 85% by mass.

In the chocolates of Examples 4 to 5 in which 5% by mass of the oil-and-fat composition 3 or 5 having the mass ratio of POP/P2O of not less than 0.95 and the PPP content of 2 to 6% by mass are blended, viscosity increase after the tempering process can be significantly prevented and drying speed (demolding property) of the chocolate is also good.

The chocolate of Comparative Example 5 in which the oil-and-fat composition 1 having a low mass ratio of POP/ P2O of 0.84 is blended is inferior to viscosity increase prevention effect, and although the oil-and-fat composition 1 has a PPP content of 3.2% by mass, but drying speed (Demolding property) is not particularly excellent.

The chocolate of Comparative Example 6 in which the oil-and-fat composition 2 having a high mass ratio of POP/ P2O of 0.98 is blended is excellent in viscosity increase prevention effect, but the oil-and-fat composition 2 has a low PPP content of 1.3% by mass, so that drying speed (Demolding property) is not particularly excellent.

In the chocolate of Comparative Example 7 in which the oil-and-fat composition 4 having the mass ratio of POP/P2O of 0.92 that is less than 0.95 is blended, viscosity increase prevention effect is observed, but it does not reach a satisfactory level. Also, the oil-and-fat composition 4 has a PPP content of only 1.8% by mass, so that drying speed (Demolding property) is not particularly excellent.

Consequently, it has been found that in order to prevent viscosity increase after the tempering process and to obtain a property that drying speed is fast, the oil-and-fat composition is needed to have the P2O content of 70 to 85% by mass, the mass ratio of POP/P2O of not less than 0.95 and the PPP content of 2 to 6% by mass.

[Verification 2 of Viscosity Increase Prevention Effect in Chocolate Dough]

Figure 2:
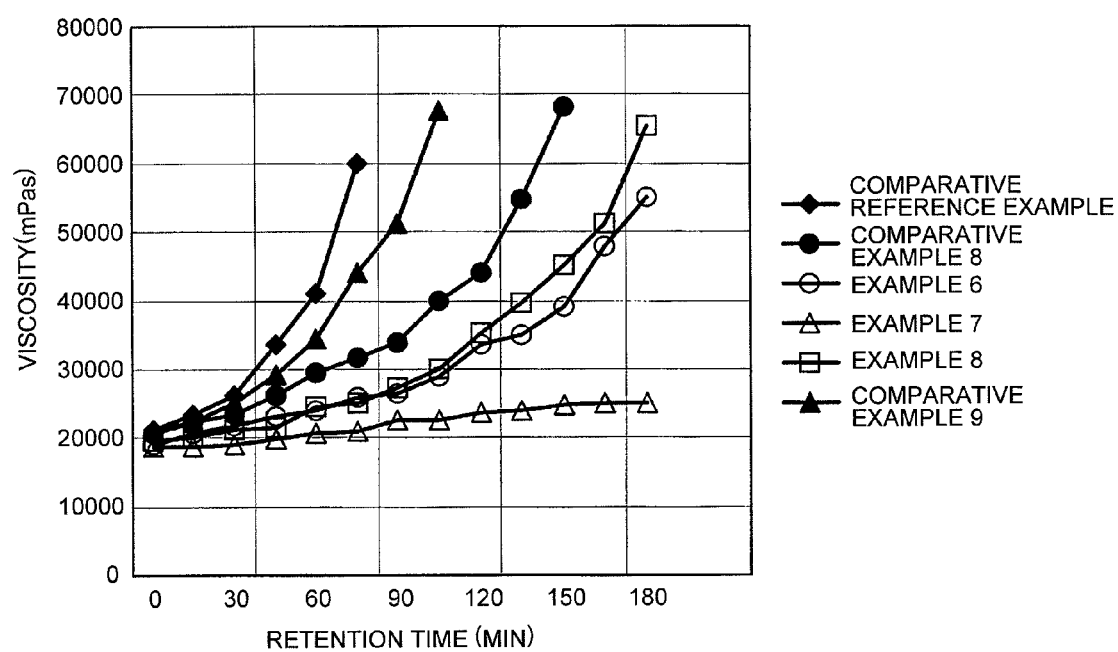
FIG. 2 is a graph showing a viscosity change of chocolate dough after tempering process (Comparative reference example, Examples 6 to 8, Comparative Examples 8 to 9).

First, 1300 g of chocolate dough (Comparative Reference Example, Comparative Examples 8 to 9 and Examples 6 to 8) were prepared by using the oil-and-fat composition 3 (Example 1), the oil-and-fat composition 6 (Example 3), the oil-and-fat composition 7 (Comparative Example 4) in accordance with the blending shown in Table 4, after a tempering process was carried out by using a desktop type tempering machine under the condition of 50 degrees C./3 min→29 degrees C./1 min→31 degrees C./3 min, it was moved to a mixer with a temperature controller in which viscosity change at 31 degrees C. was recorded with time. The viscosity was measured under the condition that a BH type viscometer is used, rotor number is 6, rotation number is 4 rpm. The measurement result is shown in Table 5 and FIG. 2 (unit of viscosity in Table 5 and FIG. 2 is mPas).

In addition, separately, the chocolate dough after the tempering process was poured into a mold so as to check a Demolding property that is used as a reference index of drying speed. After the chocolate obtained was preserved at 20 degrees C. for a week, an evaluation of meltability in the mouth was carried out. The result is shown in Table 4.

[Demolding Property]
◎: Demolded at 15 minutes after cooling (fast drying)
○: Demolded at 20 minutes after cooling
Δ: not Demolded at the above-mentioned time (slow drying)

[Meltability in the Mouth]
◎: good in meltability in the mouth
○: good in meltability in the mouth, but a little remains later
Δ: bad in meltability in the mouth

TABLE 4

Table 4. (Unit in Table 4: % by mass)

|  | Com. REF. EX. | Com. EX. 8 | EX. 6 | EX. 7 | EX. 8 | Com. EX. 9 |
|---|---|---|---|---|---|---|
| Powder sugar | 41.5 | 41.5 | 41.5 | 41.5 | 41.5 | 41.5 |
| Cacao mass | 40.0 | 40.0 | 40.0 | 40.0 | 40.0 | 40.0 |
| Cacao butter | 18.0 | 17.0 | 15.0 | 8.0 | 13.0 | 13.0 |

TABLE 4-continued

Table 4. (Unit in Table 4: % by mass)

|  | Com. REF. EX. | Com. EX. 8 | EX. 6 | EX. 7 | EX. 8 | Com. EX. 9 |
|---|---|---|---|---|---|---|
| Oil-and-fat composition 3 | — | 1.0 | 3.0 | 10.0 | — | — |
| Oil-and-fat composition 6 | — | — | — | — | 5.0 | — |
| Oil-and-fat composition 7 | — | — | — | — | — | 5.0 |
| Lecuthin | 0.50 | 0.50 | 0.50 | 0.50 | 0.50 | 0.50 |
| Peel Property | ◎ | ○ | ◎ | ◎ | ◎ | ◎ |
| Meltability in the mouth | ◎ | ◎ | ◎ | ◎ | ◎ | ○ |

(Notes):
Com. REF. EX.: Comparative Reference Example
Com. EX.: Comparative Example, EX.: Example

TABLE 5

Table 5. (Viscosity change 2 of chocolate dough) (Unit of viscosity: mPas)

|  |  | Com. REF. EX. | Com. EX. 8 | EX. 6 | EX. 7 | EX. 8 | Com. EX. 9 |
|---|---|---|---|---|---|---|---|
| Reten- tion time (min) | 0 | 21250 | 20750 | 19000 | 18750 | 19500 | 21250 |
|  | 15 | 23500 | 22250 | 20500 | 18750 | 20000 | 22250 |
|  | 30 | 26000 | 23500 | 21750 | 19000 | 21250 | 25000 |
|  | 45 | 33500 | 26000 | 23000 | 19750 | 21500 | 29250 |
|  | 60 | 41000 | 29500 | 24000 | 20750 | 24500 | 34500 |
|  | 75 | 60000 | 31500 | 25750 | 21000 | 25000 | 44000 |
|  | 90 | — | 33750 | 26500 | 22500 | 27250 | 51250 |
|  | 105 | — | 40000 | 28750 | 22500 | 30000 | 67500 |
|  | 120 | — | 44000 | 33500 | 23750 | 35250 | — |
|  | 135 | — | 54750 | 35000 | 24000 | 39500 | — |
|  | 150 | — | 68250 | 39000 | 24750 | 45000 | — |
|  | 165 | — | — | 47750 | 25000 | 51250 | — |
|  | 180 | — | — | 55000 | 25000 | 65500 | — |

(Notes):
Com. REF. EX.: Comparative Reference Example
Com. EX.: Comparative Example, EX.: Example The following has been found from the results shown in Tables 1, 4 and 5, and FIG. 2.

In the chocolate in which the oil-and-fat composition 3 having the mass ratio of POP/P2O of not less than 0.95 (0.98) and the PPP content of 2 to 6% by mass (3.1% by mass) is blended, the chocolate of Comparative Example 8 in which only 1% by mass of the oil-and-fat composition 3 is blended is not sufficient in an effect of viscosity increase prevention after the tempering process and is not excellent in the drying speed (Demolding property) than Comparative Reference Example that contains no oil-and-fat composition.

In the chocolate of Example 6 in which 3% by mass of the oil-and-fat composition 3 are blended, the viscosity increase prevention effect and the drying speed (Demolding property) reach a sufficient level, and in the chocolate of Example 7 in which 10% by mass of the oil-and-fat composition 3 are blended, viscosity increase after the tempering process is remarkably prevented, and the drying speed (Demolding property) and the meltability in the mouth of the chocolate are also good.

In the chocolate of Example 8 in which the oil-and-fat composition 6 having the mass ratio of POP/P2O of not less than 0.95 (0.96) and the PPP content of 2 to 6% by mass (5.5% by mass) is blended, the viscosity increase prevention effect and the drying speed (Demolding property) reach a sufficient level.

In the chocolate of Comparative Example 9 in which the oil-and-fat composition 7 having the mass ratio of POP/P2O of not less than 0.95 (0.95) and the PPP content of 7.6% by mass is blended, a trend of viscosity increase is remarkably exhibited and the meltability in the mouth is also affected.

Consequently, in order to prevent viscosity increase after the tempering process and to obtain a property that drying speed is fast, the oil-and-fat composition of the present invention is needed to be blended into the chocolate in a blending amount of not less than 3% by mass, and the more the blending amount is, the more excellent the effect is. In addition, it has been found that if the PPP content in the oil-and-fat composition is more than 6% by mass, a trend of viscosity increase is remarkably exhibited, so that the PPP content in the oil-and-fat composition is needed to be 2 to 6% by mass.

Examples 9 to 11 and Comparative Examples 10 to 11

Preparing Oil-and-Fat Composition

Oil-and-Fat Composition A (the Same Oil-and-Fat Composition as the Above-Mentioned Oil-and-Fat Composition 1)

A palm medium-melting point fraction 1 (composition: POP content of 62.3% by mass, mass ratio of POP/P2O of 0.84, and PPP content of 3.2% by mass, manufactured by Intercontinental Specialty Fats Sdn. Bhd. (Malaysia ISF Company)) was defined as an oil-and-fat composition A.

Oil-and-Fat Composition B (the Same Oil-and-Fat Composition as the Above-Mentioned Oil-and-Fat Composition 2):

First, 0.2% by mass of the lipase preparation A was added to 1200 g of the palm medium-melting point fraction 1 (composition: POP content of 62.3% by mass, mass ratio of POP/P2O of 0.84 and PPP content of 3.2% by mass, manufactured by Intercontinental Specialty Fats Sdn. Bhd. (Malaysia ISF Company)) and an agitation reaction was carried out at 70 degrees C. for 2 hours. Next, the lipase preparation A was eliminated by a filtration treatment, so as to obtain 1184 g of reactant. Next, after 5660 g of acetone was added to 1132 g of the reactant obtained so that the reactant was dissolved, and solid content which was obtained by being cooled to 20 degrees C. was eliminated. Next, after solid content which was obtained by that liquid portion was further cooled to 5 degrees C. was separated by filtration, elimination of acetone and purification were carried out in the usual manner, so as to obtain 792 g of an oil-and-fat composition B (composition: POP content of 78.1% by mass, mass ratio of POP/P2O of 0.98 and PPP content of 1.3% by mass).

Oil-and-Fat Composition C (the Same Oil-and-Fat Composition as the Above-Mentioned Oil-and-Fat Composition 3):

Palm hard stearin (Iodine Value: 13, manufactured by Intercontinental Specialty Fats Sdn. Bhd. (Malaysia ISF Company)) was added to the oil-and-fat composition B, whose additive amount was 2% to the oil-and-fat, so as to obtain an oil-and-fat composition C (composition: POP content of 78.0% by mass, mass ratio of POP/P2O of 0.98 and PPP content of 3.1% by mass).

Oil-and-Fat Composition D (the Same Oil-and-Fat Composition as the Above-Mentioned Oil-and-Fat Composition 5):

First, 0.3% by mass of the lipase preparation B was added to 350 g of the palm medium-melting point fraction 2 (composition: POP content of 71.5% by mass, mass ratio of POP/P2O of 0.92 and PPP content of 1.8% by mass, manufactured by Intercontinental Specialty Fats Sdn. Bhd. (Malaysia ISF Company)) and an agitation reaction was carried out at 50 degrees C. for 2 hours. Next, the lipase preparation B was eliminated by a filtration treatment, so as to obtain 337 g of reactant. Next, purification was carried out in the usual manner, so as to obtain 283 g of an oil-and-fat composition D (composition: POP content of 72.1% by mass, mass ratio of POP/P2O of 0.96 and PPP content of 3.7% by mass).

The P2O and PPP content of the above-mentioned oil-and-fat compositions A to D were analyzed by GLC (GC-2010 manufactured by Shimadzu Corporation) and the mass ratio of POP/P2O was analyzed by LC-MS/MS ("Quattro micro" manufactured by Nihon Waters K.K.). Analysis conditions of the GLC analysis and the LC-MS/MS analysis are the same conditions as the above-mentioned conditions.

[Verification 3 of Viscosity Decrease Continuation Effect in Chocolate Dough]

First, 1300 g of chocolate dough (Comparative Reference Example, Comparative Examples 10 to 11 and Examples 9 to 11) were prepared by using the respective oil-and-fat compositions A to D in accordance with the blending shown in Table 6, after a tempering process was carried out by using a desktop type tempering machine under the condition of 50 degrees C./3 min→29 degrees C./1 min→32 degrees C./3 min, it was moved to a mixer with a temperature controller in which viscosity change at 32 degrees C. was recorded with time. The viscosity was measured under the condition that a BH type viscometer is used, rotor number is 6, rotation number is 4 rpm. The measurement result is shown in Table 7 (unit of viscosity in Table 7 is mPas).

In addition, separately, the chocolate dough after the tempering process was poured into a mold so as to check a Demolding property that is used as a reference index of drying speed after the coating or the enrobing. After the chocolate obtained was preserved at 20 degrees C. for a week, an evaluation of meltability in the mouth was carried out. The result is shown in Table 6.

[Demolding Property]
◎: Demolded at 15 minutes after cooling (fast drying)
○: Demolded at 20 minutes after cooling
Δ: not Demolded at the above-mentioned time (slow drying)

[Meltability in the Mouth]
◎: good in meltability in the mouth
○: good in meltability in the mouth, but a little remains later
Δ: bad in meltability in the mouth

TABLE 6

Table 6. (Unit in Table 6: % by mass)

| | Com. REF. EX. | Com. EX. 10 | Com. EX. 11 | EX. 9 | EX. 10 | EX. 11 |
|---|---|---|---|---|---|---|
| Chocolate fat | 40 | 37 | 37 | 37 | 37 | 35 |
| Powder sugar | 43.70 | 46.70 | 46.70 | 46.70 | 46.70 | 48.70 |
| Cacao mass | 35.00 | 35.00 | 35.00 | 35.00 | 35.00 | 35.00 |
| Cacao butter | 20.75 | 17.75 | 12.75 | 12.75 | 12.75 | 10.75 |
| Oil-and-fat composition A | — | — | 5.0 | — | — | — |
| Oil-and-fat composition B | — | — | — | 5.0 | — | — |
| Oil-and-fat composition C | — | — | — | — | 5.0 | — |
| Oil-and-fat composition D | — | — | — | — | — | 5.0 |
| Lecuthin | 0.50 | 0.17 | 0.33 | 0.33 | 0.33 | 0.17 |
| PGPR | — | 0.33 | 0.17 | 0.17 | 0.17 | 0.33 |
| Flavor | 0.05 | 0.05 | 0.05 | 0.05 | 0.05 | 0.05 |
| Peel Property | ◎ | ◎ | Δ | ○ | ◎ | ◎ |
| Meltability in the mouth | ◎ | ◎ | ○ | ◎ | ◎ | ◎ |

(Notes):
Com. REF. EX.: Comparative Reference Example
Com. EX.: Comparative Example, EX.: Example
PGPR: polyglycerin condensed ricinoleate (Trade name: Sunsoft Nos. 818DG, manufactured by Taiyo kagaku Co. Ltd)

TABLE 7

Table 7. (Viscosity change 3 of chocolate dough) (Unit of viscosity: mPas)

| | | Com. REF. EX. | Com. EX. 10 | Com. EX. 11 | EX. 9 | EX. 10 | EX. 11 |
|---|---|---|---|---|---|---|---|
| Retention time (min) | 0 | 25000 | 13500 | 15000 | 16500 | 17000 | 15500 |
| | 60 | 35750 | 19000 | 17000 | 17000 | 17750 | 15750 |
| | 120 | 80250 | 52750 | 21250 | 19500 | 20250 | 19000 |
| | 180 | — | 102750 | 23500 | 21000 | 23250 | 21250 |
| | 240 | — | — | 25750 | 23250 | 24750 | 22750 |
| | 300 | — | — | 29250 | 24500 | 26000 | 24750 |
| | 360 | — | — | 35750 | 25750 | 28750 | 31250 |

(Notes):
Com. REF. EX.: Comparative Reference Example
Com. EX.: Comparative Example, EX.: Example As is clear from Table 7, the chocolate dough of Examples 9 to 11 has a capability that not only decreases viscosity of the dough just after the tempering process, but also continues a state of low viscosity for 5 to 6 hours.

Further, as is clear from Table 6, the chocolate dough of Example 9 is not particularly excellent in the drying speed (Demolding property), but the meltability in the mouth is good, and the chocolate dough of Examples 10 to 11 is good in both of the drying speed (Demolding property) and the meltability in the mouth of the chocolate.

INDUSTRIAL APPLICABILITY

A tempering chocolate into which the oil-and-fat composition according to the present invention is blended is most suitable for the coating, particularly the enrobing since viscosity after the tempering process can be kept low, and load of the enrobing work in which complex temperature control is needed can be extremely reduced.

In addition, the tempering chocolate according to the present invention is most suitable for the coating, particularly the enrobing since viscosity after the tempering process can be kept low, and also it is economically excellent since the oil content is low.

What is claimed is:
1. An oil-and-fat composition, comprising:
75 to 80% by mass of an oleoyldipalmitin (P2O) component, wherein the oleoyldipalmitin (P2O) component contains a symmetric triglyceride 1,3-dipalmitoyl-2-oleoylglycerin (POP) in the oleoyldipalmitin (P2O) component at a ratio of the amount of 1,3-dipalmitoyl-2-oleoylglycerin (POP) to the amount of the oleoyldi- palmitin (P2O) component [(POP)/(P2O)] of 0.95 not less than by mass; and 2 to 6% by mass of a tripalmitin (PPP) component,
wherein the oil-and-fact composition is obtained by using a palm medium-melting point fraction as a raw material.

2. The oil-and-fat composition according to claim 1, wherein the content of the tripalmitin (PPP) component is 3 to 4% by mass.

3. A tempering chocolate comprising:
3 to 60% by mass of the oil-and-fat composition according to claim 1.

4. The tempering chocolate according to claim 3, wherein the tempering chocolate is used for coating or enrobing.

5. A confectionery product or a bakery product using the tempering chocolate according to claim 3.

6. A tempering chocolate comprising:
2 to 19% by mass of the oil-and-fat composition according to claim 1;
29 to 38% by mass of a fat; and
a polyglycerin condensed ricinoleate.

7. The tempering chocolate according to claim 6, wherein the content of the 1,3-dipalmitoyl-2-oleoylglycerin (POP) in the oil-and-fat composition is not less than 72% by mass.

8. The tempering chocolate according to claim 6, wherein the ratio of the amount of 1,3-dipalmitoyl-2-oleoylglycerin (POP) to the amount of the oleoyldipalmitin (P2O) component [(POP)/(P2O)] is not less than 0.96 by mass.

9. A confectionery product or a bakery product using the tempering chocolate according to claim 6.

10. A process for preventing viscosity increase of a tempering chocolate after tempering process comprising:
blending 3 to 60% by mass of the oil-and-fat composition according to claim 1 into a chocolate.

11. A process for production of a tempering chocolate comprising:
blending 3 to 60% by mass of the oil-and-fat composition according to claim 1 into a chocolate.

12. A viscosity reduction retention agent of a tempering chocolate comprising:
the oil-and-fat composition according to claim 1; and
a polyglycerin condensed ricinoleate.

13. A process for retaining viscosity reduction of a tempering chocolate comprising:
blending the oil-and-fat composition according to claim 1 and a polyglycerin condensed ricinoleate.

14. A process for production of a tempering chocolate comprising the steps of:
blending 2 to 19% by mass of the oil-and-fat composition according to claim 1, and adjusting a content of an fat to 29 to 38% by mass; and
blending a polyglycerin condensed ricinoleate.

* * * * *